United States Patent [19]
Nakamura et al.

[11] Patent Number: 5,198,159
[45] Date of Patent: Mar. 30, 1993

[54] PROCESS OF FABRICATING THREE-DIMENSIONAL OBJECTS FROM A LIGHT CURABLE RESIN LIQUID

[75] Inventors: Yoshimitsu Nakamura, Settsu; Teruyoshi Kuribayashi, Neyagawa; Yoshiyuki Utinono, Yawata; Yoshikazu Higashi, Kadoma; Syungo Ozawa, Uji; Shinobu Ikeno, Neyagawa, all of Japan

[73] Assignee: Matsushita Electric Works, Ltd., Osaka, Japan

[21] Appl. No.: 594,018

[22] Filed: Oct. 9, 1990

[51] Int. Cl.⁵ .................. B29C 35/08; B29C 41/02; B29C 41/04
[52] U.S. Cl. .................. 264/22; 156/273.5; 156/275.5; 156/307.1; 264/71; 264/308; 264/310; 264/311; 365/106; 365/107; 427/240; 427/581; 427/596
[58] Field of Search .................. 264/22, 71, 255, 308, 264/310, 311; 156/242, 273.3, 273.5, 275.5, 307.1; 427/53.1, 54.1, 240; 250/492.1; 365/106, 107, 119, 120, 126, 127; 430/270, 327, 328, 394

[56] References Cited

U.S. PATENT DOCUMENTS 4,961,154 10/1990 Pomerantz et al. ............ 264/22 X

FOREIGN PATENT DOCUMENTS

| 56-144478 | 11/1981 | Japan . | |
|---|---|---|---|
| 62-35966 | 2/1987 | Japan . | |
| 62-41006 | 2/1987 | Japan | 250/492.1 |
| 63-145015 | 6/1988 | Japan | 425/174.4 |
| 2-95830 | 4/1990 | Japan | 264/22 |
| 2-111528 | 4/1990 | Japan . | |

Primary Examiner—Leo B. Tentoni
Attorney, Agent, or Firm—Stevens, Davis, Miller & Mosher

[57] ABSTRACT

A process of fabricating a three-dimensional object from a light curable liquid resin includes irradiating a light to a surface of the light curable liquid resin so as to form successive cross-sectional layers of the cured resin at that surface and to superimpose the successive layers on each other. An improvement resides in that one or more of the successive layers is made to have different portions made through different curing conditions. By providing such cross-sectional layers having different curing conditions, the resulting three-dimensional object can be made into accurate outer configuration without leaving any critical residual stress therein.

13 Claims, 13 Drawing Sheets

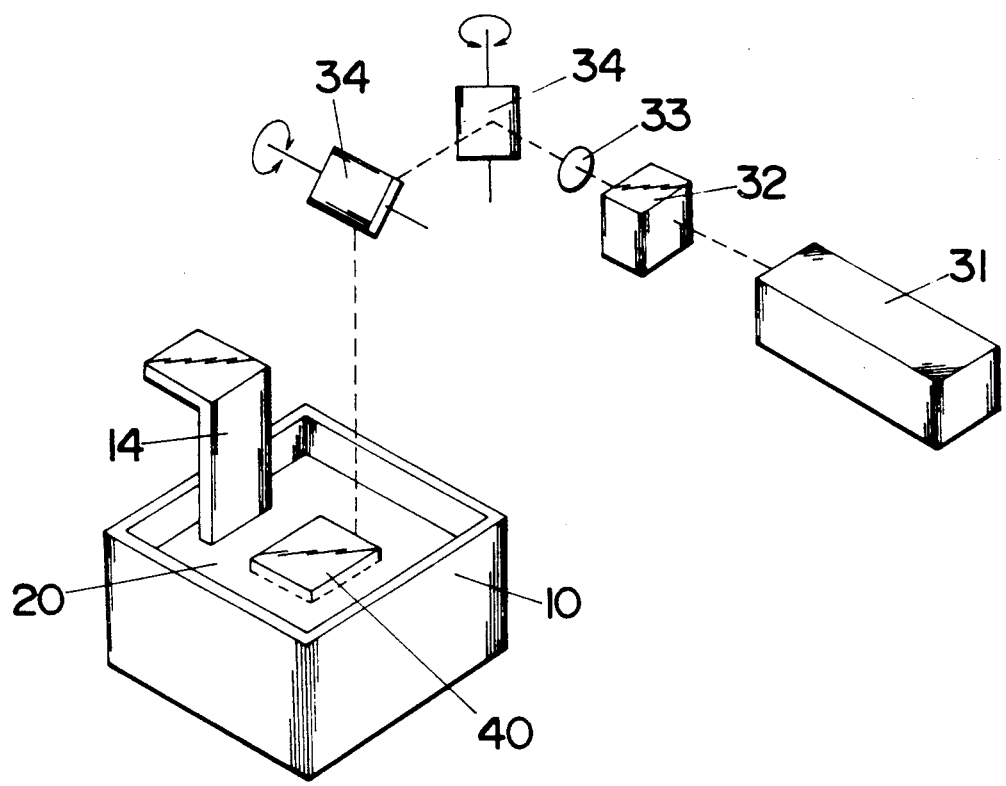
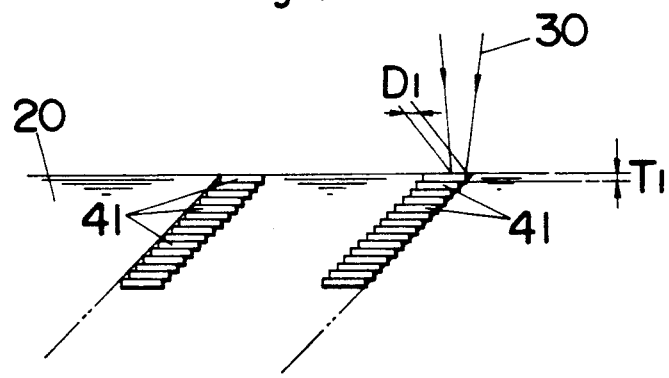
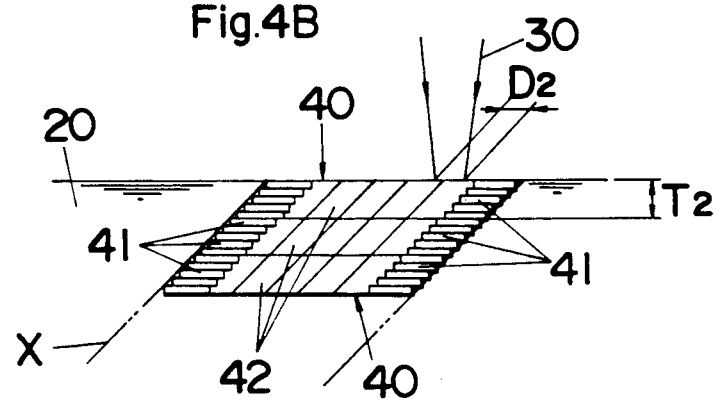

111(112)

PROCESS OF FABRICATING THREE-DIMENSIONAL OBJECTS FROM A LIGHT CURABLE RESIN LIQUID

BACKGROUND OF THE INVENTION

1. Field of the Invention

The present invention is directed to a process of fabricating a three-dimensional object from a light curable liquid resin, and more particularly to an improvement in such process for fabricating the three-dimensional object with increased accuracy and efficiency.

2. Description of the Prior Art

Such a three-dimensional object forming process from a light curable resin has been proposed in the art to be advantageous in fabricating a small quantity of product models or prototypes without relying upon molds or machining tools, as disclosed in Japanese Patent Early Publication [Kokai] No. 56-144478, and 62-35966. As schematically illustrated in FIGS. 1 and 2 of the attached drawings, the typical prior art process utilizes a container 10 supplied with a light curable liquid resin 20 and a light beam 30 such as a laser beam which is directed to the surface of the liquid resin 20 for solidification of the liquid resin 20 to a certain depth from the surface. It is therefore possible to form a cured layer 1 at the liquid surface which has a desired pattern or cross-sectional configuration by moving the light beam 30 across the liquid resin surface. Thus formed layer 1 is held on a movable carrier plate 12 and is lowered into the liquid resin 20, at which condition, new liquid flows over the layer 1 and is subjected to a like beam irradiation to form on that layer another cured layer 1 of the same or different configuration. In this manner, successive cured layers are build up to fabricate a three-dimensional object of any desired configuration. In the illustrated prior art system, a lens 33 is incorporated to focus the light beam 30 at a point immediately adjacent the surface of the liquid resin 20 to give an intense light energy thereto for efficient solidification of the liquid to a fixed depth. The carrier plate 12 is connected through an elevator arm 14 to a drive source so as to be vertically movable in a step-wise fashion within the container 10. The thickness of the individual layers 1 can be suitable controlled by adjusting the strength and focusing spot of the light beam 30, and the vertical distance for each step-wise movement of the carrier plate 21.

As known from the above, a three-dimensional object is expected to have a more accurate and smoother outer configuration as the successive layers are made thinner. This is because, as shown in FIG. 2, the two-dimensional configurations of the successive layers 1 will have to change over a differing cross-sectional portion of the desired object to thereby eventually leave apparent steps 4 between the ends of successive layers 1, which steps 4 appear on the outer surface of the three-dimensional object detracting from a smoothly curved surface, and therefore degrading the overall appearance of the object. Accordingly, there is a need in the above process to form the successive layers as thin as possible for fabrication of an accurately outlined three-dimensional object. However, as the layers are made thinner, the overall number of the layers is increased with an attendant increase in the step-wise operations of lowering the plate 12, thereby requiring more fabrication time and therefore lowering fabrication efficiency.

From a standpoint of improving fabrication efficiency, it has been a practice to use a light beam having an intensity strong enough to expedite the solidification and to move or scan the light beam quickly across the surface of the liquid resin for rapid solidification of the liquid resin. However, such rapid solidification inevitably incurs a correspondingly large amount of curing shrinkage and therefore residual stress. In fact, when the solidification is carried out slowly or steadily by moving the light beam slowly across the liquid surface, the layer being cured can be supplied with the liquid resin from the surroundings so as to compensate for the curing shrinkage. In addition shrinkage stress is relieved during slow solidification, thereby reducing the overall amount of the curing shrinkage as well as the residual stress in the cured layer. Nonetheless, with rapid solidification as required for increased fabrication efficiency, the supply of the liquid from the surrounding cannot keep with the shrinkage occurring at a rapid rate. In addition, the solidification proceeds before the shrinkage stress is sufficiently relieved, thereby leaving a relative large shrinkage as well as residual stress in the cured layer. Such large curing shrinkage and residual stresses are not acceptable and should be avoided for fabrication of a three-dimensional object, because of the fact that the curing shrinkage results in dimensional variations or in inaccurate reproduction of the three-dimensional object and that the residual stress will be relieved gradually over a long period after the fabrication of the three-dimensional object, this in turn can result in dimensional variation. Further, in the case when the layer is formed by continuously moving the light beam across the surface of the liquid resin, there may be develop local deformation or localized residual stress due to possible difference in the shrinkage between the previously and later cured portions, which increases the possibility of leaving remarkable local strain or uneven residual stress in the cured layer. Accordingly, it is also demanded in the fabrication of three-dimensional objects to minimize the curing shrinkage and the residual stress without considerable sacrifice in the fabrication efficiency, for accurate fabrication of the three-dimensional object. In the prior art, an attempt has been made also to obtain an accurate three-dimensional object by delicately controlling penetration depth and/or moving range of the light beam with the use of a computer. However, even with such delicate control, it is still difficult to eliminate the curing shrinkage and therefore obtain an accurately shaped three-dimensional object.

SUMMARY OF THE INVENTION

The above problems and insufficiency can be eliminated in the present invention which provides an improved process of fabricating a three-dimensional object from a light curable resin. A light is radiated to a surface of a light curable liquid resin to produce successive layers of cured resin having the same or different two-dimensional configurations, which are superimposed on each other to present a three-dimensional object. The improvement is characterized to form one or more of the successively cured resin layers to have different portions developed through different curing conditions in such a manner as to improve accuracy of the resulting object and minimize residual stress therein.

Accordingly, it is therefore a primary object of the present invention to provide an improved process of fabricating a three-dimensional object which is capable of obtaining an accurately outlined three-dimensional object substantially free from residual stress.

In a first version of the present invention, an unique procedure is utilized to form one or more of the successive layers to each include successive thin outer laminae of the cured resin at a peripheral portion defining the outer perimeter of the three-dimensional object and a relatively thick inner lamina at the inner potion defining the core of the three-dimensional object, the successive adjacent thin outer laminae cooperate with the one thick inner lamina to compose one of the layers. With this technique, the outer peripheral portion of an intended three-dimensional object can be formed from a number of thin successive layers to have a smooth or accurate surface in precise conformity to a desired configuration, while the center portion or the concealed portion of the object can be formed from a smaller number of thick successive layers. Consequently, it is possible to give a delicate surface finish to the three-dimensional object without involving undue increase in the overall processing operation and time.

It is therefore another object of the present invention to provide an improved process of fabricating a three-dimensional object which is capable of obtaining a smooth and accurate outline without sacrificing the overall fabrication efficiency.

In a second version of the present invention, one or more of the successive layers are prepared as composite layers each comprising substantially fully-cured and half-cured regions. The successive layers including such composite layers are superimposed on each other and are then subjected to reactive environment in order to complete the curing of the half-cured region of the composite layers for integration into a three-dimensional object. At the formation of each composite layer, the half-cured region is allowed to deform within a limited extent and therefore is capable of absorbing deformation or shrinkage stress developed at the solidification of the adjacent fully-cured region, thereby mitigating or reducing &:he residual stress in the fully-cured regions. Consequently, by constructing the principal portion, i.e., outer shell or framework of an intended three-dimensional object with the fully-cured regions and constructing the remaining portions with the half-cured regions, it is possible firstly to minimize the amount of shrinkage or stress developed at the principal portion and secondly to absorb that shrinkage or stress in the principal portion well in the half-cured portion. The amount of the shrinkage or stress developed at the final curing of converting the half-curing regions into a fully-cured condition can be made smaller than in a case where the light curable resin would be evenly cured directly into the fully-cured region, so that it will not act to critically deform the fully-cured regions. Consequently, the resulting three-dimensional object can have an accurate configuration and moreover can be free from critical residual stress which would eventually result in undesirable deformation over a long period of time.

It is therefore a further object of the present invention to provide an improved process of fabricating a three-dimensional object which is capable of accurately presenting the three-dimensional object, yet causing no critical residual stress which would lead to post-fabrication deformation.

In order to prepare the above composite layer, it is preferred to utilize a light source which provides a first light beam and a second light beam for solidification of the liquid resin, respectively into substantially fully-cured and half-cured regions. By selectively directing the first and second light beam on the surface of the liquid resin, the composite layers can be easily obtained. This is particularly advantageous for making up the outer shell of the object with the initially fully-cured regions of the composite layers and making up the remaining core of the object with the half-cured portion in order to fabricate three-dimensional object of accurate outer configuration, which is therefore a still further object of the present invention.

A third version of the present invention utilizes a light source which provides a first light beam and a second light beam for solidification of the light curable liquid resin respectively into substantially fully-cured and half-cured conditions. The first and second light beams are controlled to move around the surface of the light curable liquid resin in such a manner that the second light beam is firstly directed to the surface to provide a tentative half-cured region, and thereafter the first light beam is directed to the half-cured region to covert it into a substantially fully-cured region which defines a final configuration of the three-dimensional object. With this procedure of obtaining the fully-cured region by way of the half-cured condition in which the resin flow can be restricted to a certain extent, the half-cured regions can exhibit no further critical shrinkage as a result of being converted into the fully-cured condition. Therefore, it is readily possible to minimize the residual stress in the fully-cured region defining the final configuration of the three-dimensional object and accordingly to accurately fabricate the same, which is therefore a still further object of the present invention.

Preferably, a three-dimensional object is fabricated by the steps of firstly forming a bottom layer having its entire region solidified into a substantially fully-cured condition, and then forming successively intermediate layers which have different portions solidified into a substantially fully-cured condition and half-cured or uncured conditions, first one of the intermediate layers being superimposed on the bottom layer and the remaining intermediate layers being superimposed on each other as they are formed. Then, a top layer having its entire portion solidified into substantially fully-cured condition is formed and superimposed on the last intermediate layer to provide a laminate of the layers which is thereafter subjected to an reactive environment in order to complete the curing of the half-cured or uncured resin. One or more of the intermediate layers may be formed to have its entire portion solidified into substantially fully-cured conditions in consideration of a desired configuration of the three-dimensional object. Accordingly, by making up the outer shell or framework of the intended three-dimensional object with the substantially fully-cured resin of the individual layers, it is readily possible to confine the half-cured or uncured resin of the intermediate layers within the fully-cured resin, preventing accidental outflow of the resin prior to the final step of completing the solidification to thereby provide an accurately configured three-dimensional object, while retaining the advantage of minimizing the residual stress in the finished object for the reason as discussed in the above.

The present invention further discloses still other features advantageous for making the layers as thin as possible. For this purpose, specially configured device are utilized to provide a smooth supporting surface over which the liquid resin can spread uniformly to form thereon a thin film of the liquid resin that is transformed into a correspondingly thin layer by exposure to the light. One such device comprises a planar support having a generally flat smooth surface receiving the drops of the liquid resin. The support is driven to oscillate or rotate substantially within a horizontal plane including the supporting surface in order to positively and smoothly spread the liquid resin over the supporting surface to form a very thin film thereof for solidification into correspondingly thin layer of the cured resin. Another device comprises a generally cylindrical barrel having a horizontal center axis and having a smooth inner supporting surface on which the liquid resin is supplied. The barrel is driven to rotate about the center axis so that the liquid resin is forced to spread uniformly across the inner supporting surface to form a thin film which is then converted by exposure to the light into a correspondingly thin layer of cured resin. In this manner, the thin layers can be successively formed on the supporting surface in order to give an accurate configuration to the resulting three-dimensional object, which is therefore a still further object of the present invention.

These and still other advantageous features and objects of the present invention will become more apparent from the following detailed description of the invention when taken in conjunction with the attached drawings.

BRIEF DESCRIPTION OF THE DRAWINGS

FIG. 3 is a schematic view illustrating a system utilized in the present invention for fabrication of a three-dimensional object;

FIGS. 4A and 4B are respectively sectional views illustrating the steps of fabricating the three-dimensional object in accordance with a first embodiment of the present invention;

DETAILED DESCRIPTION OF THE PREFERRED EMBODIMENTS

First Embodiment

Figure 1:
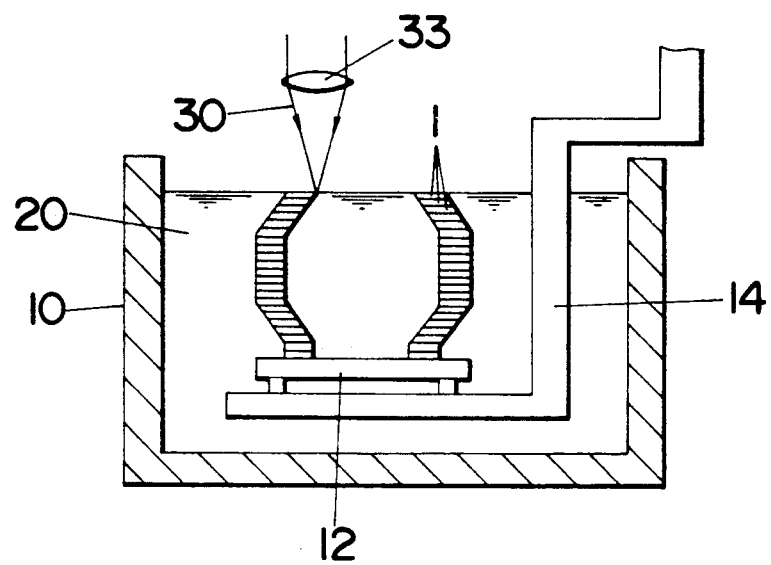
FIG. 1 is a schematic view illustrating a general system for fabricating a three-dimensional object from a light curable liquid resin.
Figure 2:
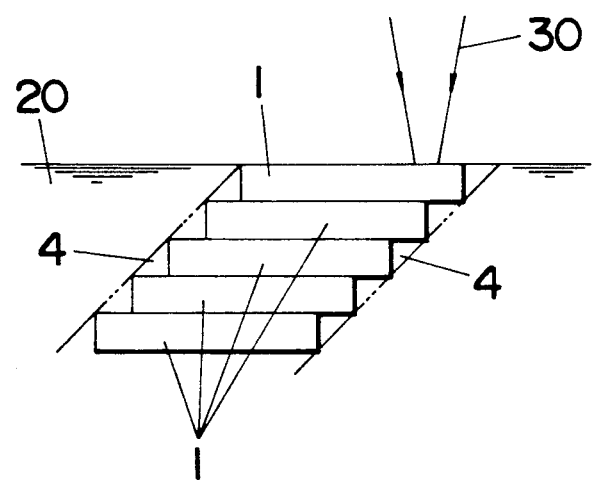
FIG. 2 is an enlarged sectional view of a portion of the three-dimensional object obtained through a typical prior art process.

Referring first to FIGS. 4A and 4B, there is shown an improved process of fabricating a three-dimensional object in accordance with a first embodiment of the present invention. The process may utilize a system of FIGS. 1 and 3 including a container 10 filled with a light curable resin 20, a light beam 30 directed to the surface of the liquid resin 20 so as to form thereat a cured layer 40, and a carrier plate 12 connected to an elevator arm 14 to be vertically movable within the container 10. The liquid resin includes an ultraviolet light curable resin or the like resin generally utilized in the art for the fabrication of prototypes or product models. The light beam 30, for example, He-Cd laser beam is directed from a light source 31 through a shutter 32, a convergent lens 33, and scan mirrors 34 to the surface of the liquid resin 20 so that it can move in X-Y directions to draw any desired two-dimensional pattern or configuration for solidification of the liquid resin into such pattern or configuration. Initially, the carrier plate 12 is held immediately below the surface of the liquid resin 20 to receive thereon the first layer 4 formed by exposure to the light beam 30. Subsequently, the plate 12 is lowered slightly to have fresh liquid resin flow over the layer 40 on the plate 12. The fresh liquid resin is then solidified by like exposure to the light beam 30 into another cured layer 40 which is stacked upon the preceding layer 40. In this manner, successive layers 40 are formed and superimposed on each other to fabricate a three-dimensional object. The successive layers 40 of cured resin will be integrated into one piece of the object owing to the natural adhesive properties of the liquid resin. All of the above steps are conventional and no further description is deemed necessary.

The improved process of this embodiment is contemplated to make up the outer portion or shell of the intended three-dimensional object with a number of relatively thin laminae 41 for giving an accurate outline to the object while making up the inner portion or core with a fewer number of relatively thick laminae 42 for increasing fabrication rate or efficiency. In other words, as shown in FIG. 4B, each of the layers 40 constructing the object is formed to have at its outer portion a number of successive thin laminae 41 and have in its inner portion a single thick lamina 42. In the process, light beam 30 is firstly directed to the surface of the liquid resin 20 in order to selectively form successive laminae 41 at a portion defining the outer periphery of the intended object, as shown in FIG. 4A. Then, the light beam 30 is shifted for solidification of the liquid resin 20 confined within the stack of the previously formed outer thin laminae 41 to form a single inner thick lamina 42, which becomes integrated with the outer thin laminae 41 to present a single composite layer 40. This process is repeated in a step-wise manner to provide successively such composite layers 40 until the intended three-dimensional object is fabricated. The thickness $T_1$ of the outer thin lamina 41 is selected to satisfy surface smoothness required for the intended object, although it is of course preferred to be as fewer as possible. While on the other hand, the thickness $T_2$ of the inner thick lamina 42 is selected to be considerably greater than $T_1$ of the outer thin lamina 41 in consideration of increasing the fabrication efficiency. As is apparent form the above, when the outer thinner lamina 41 is formed to have thickness $T_1$ one-fourth of $T_2$, the stack of the thinner laminae 41 can provide an outer surface which is four times smoother than that of the inner thick laminae 42. The outer thin lamina 41 is formed to have a width as small as possible but enough to prevent the stack of the thin outer laminae 41 from collapsing the outer configuration defined thereby. As to the light beam 30, it is possible to use the light beam 30 commonly to form the thin as well as thick laminae 41 and 42 by controlling it to change the scan speed, i.e., move the light beam 30 faster in forming the thin lamina 41 than in forming the thick lamina 42. However, it is preferred to select a smaller focus spot $D_1$ for solidification of the outer thin lamina 41 than that $D_2$ for the inner thick lamina 42. Whereby the light beam 30 can provide more intense energy at the solidification of the outer thinner lamina 41 than at the solidification of the inner thick lamina 42, which makes it possible to move the light beam 30 at an increased speed in forming the outer thinner lamina 41 and therefore contributes to enhancing the fabrication efficiency.

Although such composite layers 40 is shown in the above embodiment to be formed at the surface of the liquid resin 20 in the container 10, it is also possible to form the like composite layer effectively and readily into a very thin configuration, as described in the following modifications. In the modifications, unique processes and devices are illustrated, merely for a simplicity purpose, to form thin layers of uniformly cured resin rather than the above composite layers.

Figure 5:
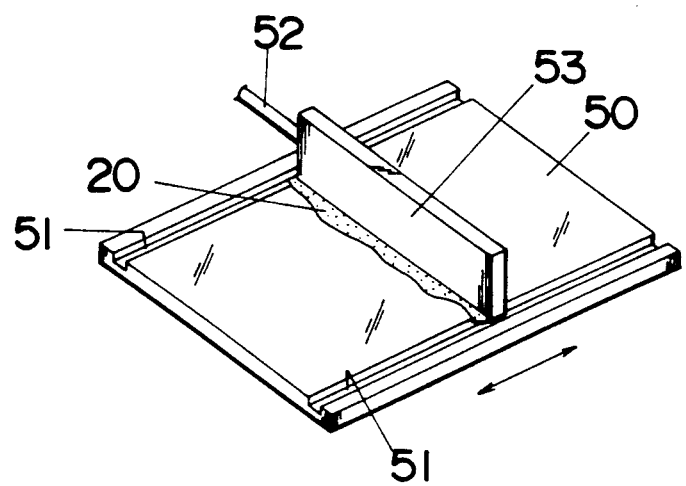
FIGS. 5 and 6 are schematic views illustrating a device which may be utilized in the present invention for making a thin film of the liquid resin to be formed into a correspondingly thin layer of cured resin.
Figure 6:
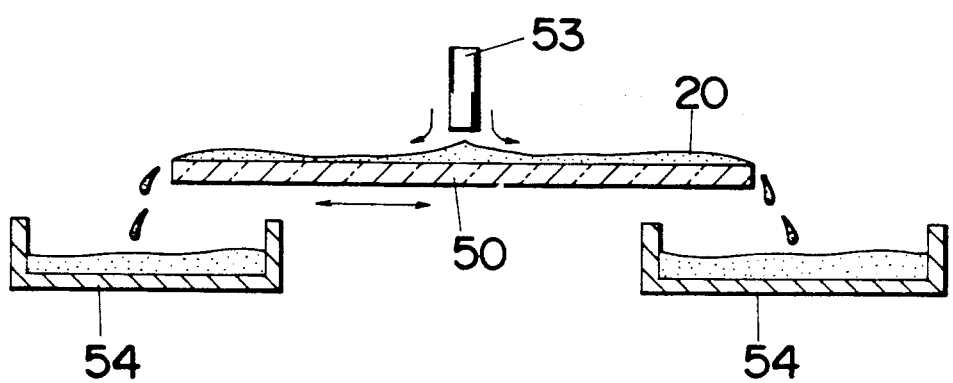
Figure 7:
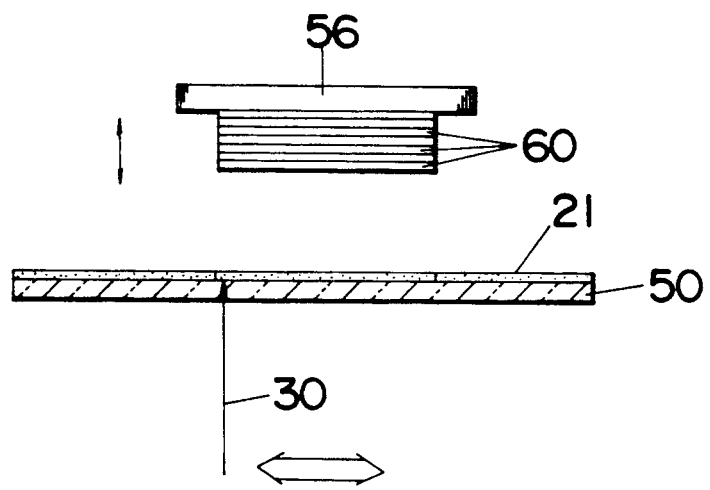
FIG. 7 is a schematic view illustrating the building up of the thin layers obtained in FIGS. 5 and 6 into the three-dimensional object.

In a first modification of FIGS. 5 to 7, a generally rectangular carrier plate 50 is utilized to receive thereon the like liquid resin 20 which is supplied through a supply line 52 and is fed in the form of drops onto the plate 50 by means of an elongated drop server 53 over substantially the entire width of the carrier plate 50. The carrier plate 50 is shaped from such material as transparent glass or the like to have a generally smooth planar surface on which the liquid resin 20 is supplied, and is coupled to an electric motor or like drive source through a suitable transmission mechanism so as to be movable along one dimension, or the lengthwise direction perpendicular to the length of the drop server 53. A pair of gutters 51 are formed along the lateral ends of the plate 50 to discharge an excess amount of the liquid resin into suitable collectors 54. A light source (not shown) is provided below the plate 50 to direct the light beam 30 therethrough to the liquid resin 20. As shown in FIG. 7, a vertically movable pull-up lift 56 is disposed above the plate 50 to pull up successively layers 60 as they are formed for building up the same into a desired three-dimensional object. The liquid resin 20 supplied on to the plate 50 tends to flow thereover by the effect of its own weight. At this condition, however, the liquid resin 20 is reluctant to flow smoothly because of less fluidity or high viscosity that the liquid resin inherently has, thus remaining in a portion and failing to spread uniformly over the plate 20, although it may so spread after an elapse of a very extended time. Then, the plate 50 is driven to vibrate in a horizontal plane so that the liquid resin 20 is stimulated or forced to spread uniformly over the plate 20. That is, when subjected to such vibration, the liquid resin 20 is prompted to spread uniformly in association with the viscosity and surface tension of the liquid resin, thereby defining a very thin liquid resin film 21 of substantially uniform thickness on the plate 50. The liquid resin 20 spreading beyond the periphery of the plate 50 or excess amount of the resin will be discharged through the gutters 51 into the collectors 54. It is this thin film 21 that is subjected to the light beam 30 for solidification into the correspondingly thin cured layer 60. The thickness of the film or the cured layer 60 can be controlled suitably by varying the vibration mode or rate. A like new thin liquid resin film 21 is formed on the plate 50 in a like manner each after the cured layer 60 is taken therefrom, such that the thin layers 60 can be successively formed and integrated into the desired three-dimensional object. At the step of forming each thin layer 60 in this process, the light is directed through the plate 50 to a smooth interface defined between the plate 50 and the liquid resin film 21, so that it can exactly focus at that smooth interface without being scattered thereat as might be seen in the first embodiment where the light is directed to the upper surface of the liquid resin stored in the container 10 Therefore, it is readily possible to give a smooth surface to the resulting cured layer 60 with this process.

When a light source is utilized, instead of the light beam, which is capable of directing diffused light over the plate 50 from below, the liquid resin film 21 can be simultaneously cured over the entire desired area by covering the bottom of the plate 50 with a suitably patterned mask of non-transparent material. The vibration applied to the plate 50 is not necessarily along only one direction of the plate 50, and may occur along different directions within the horizontal plane, and even in combination with vertical vibrations. The plate 50 is not be necessarily of glass and may be of ceramic, metal, or plastics having a generally smooth supporting surface, and may be preferably coated with a fluorocarbon resin for facilitating the separation of the cured layer from the plate 50. In the case where a non-transparent plate is utilized, the light beam is directed from above the plate while keeping the pull-up lift temporarily aside from the plate. Further, the supporting surface may be somewhat curved into concave or convex configuration as is necessary.

Figure 8:
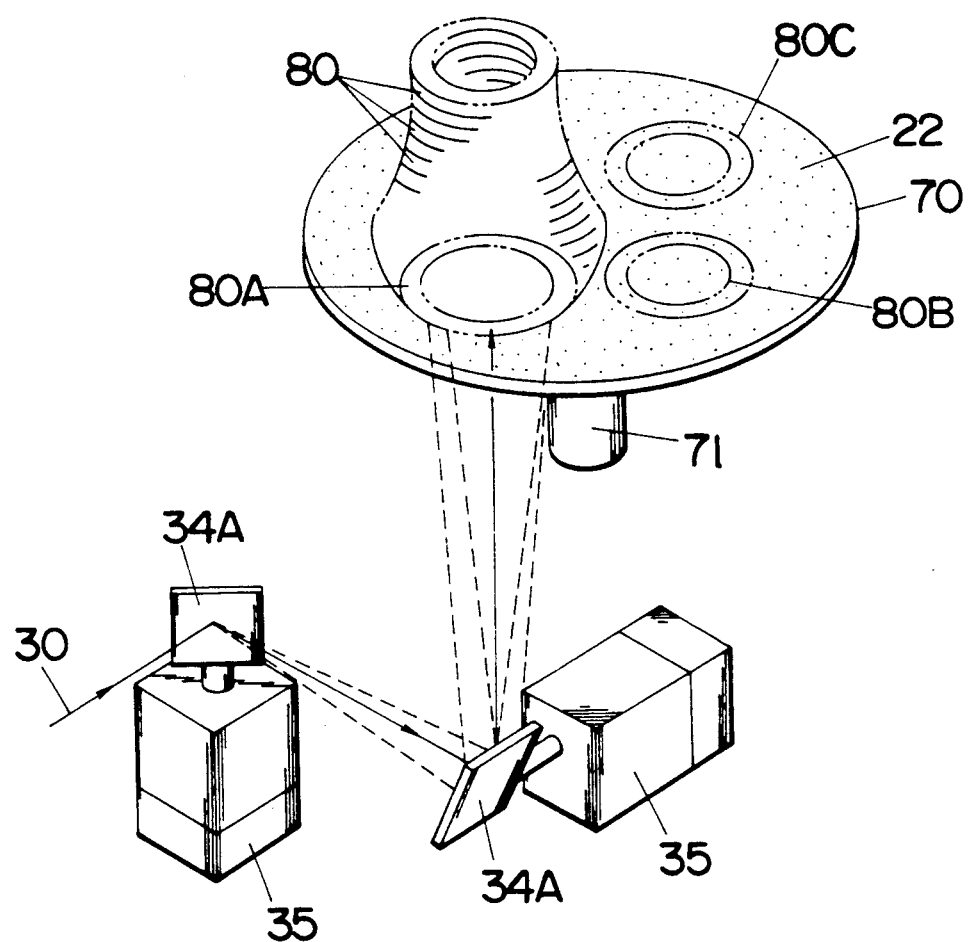
FIG. 8 is a schematic view illustrating another device which may be utilized in the present invention to make successively thin layers of the cured resin into a three-dimensional object.

FIGS. 8 and 9 show another modification of the above embodiment designed to provide also a very thin layer of the cured resin. A disc-shaped carrier plate 70 of transparent material is utilized in this modification to provide thereon a like thin film 22 of the liquid resin. The light beam 30 is directed through a pair of rotatable mirrors 34A of galvano-scanners 35 to the plate 70 from below as moving in X-Y directions in order to draw a desired two-dimensional pattern. The plate 70 has a center axle 71 through which it is connected to an electric motor or the like drive mechanism for rotation about the axle 71 in a horizontal plane. The liquid resin is supplied onto the center of the plate 70 and is forced to flow radially toward the periphery thereof as the plate 70 rotates. The rotation may be continuous or step-wise either in one direction or opposite directions with a constant or varying rotational speed in order to obtain a uniformly spread thin film 22 of the liquid resin. Such rotation mode is determined in consideration of the property of the liquid resin and an intended thickness of the film 22.

Figure 9A:
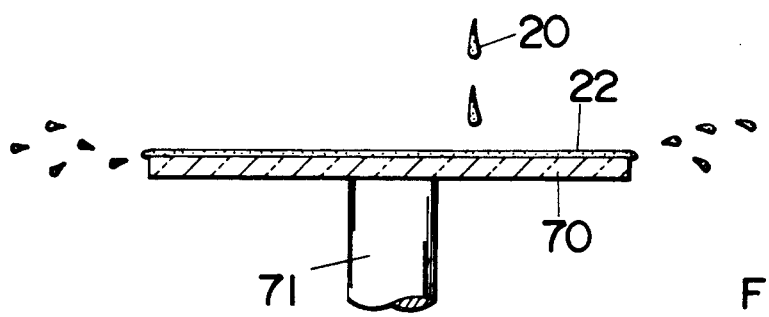
FIG. 9, composed of FIGS. 9A to 9D, is a series of block diagrams illustrating the steps of forming, with the device of FIG. 8, the thin film of the liquid resin, forming the thin layer of the cured resin, superimposing the thin layers, and integrating the thin layers into a three-dimensional object.
Figure 9B:
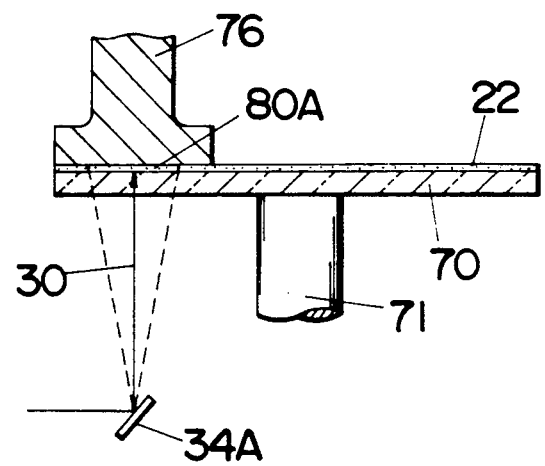
Figure 9C:
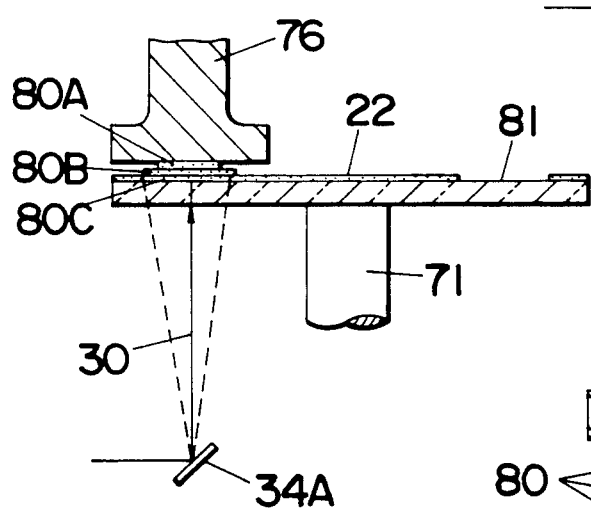
Figure 9D:
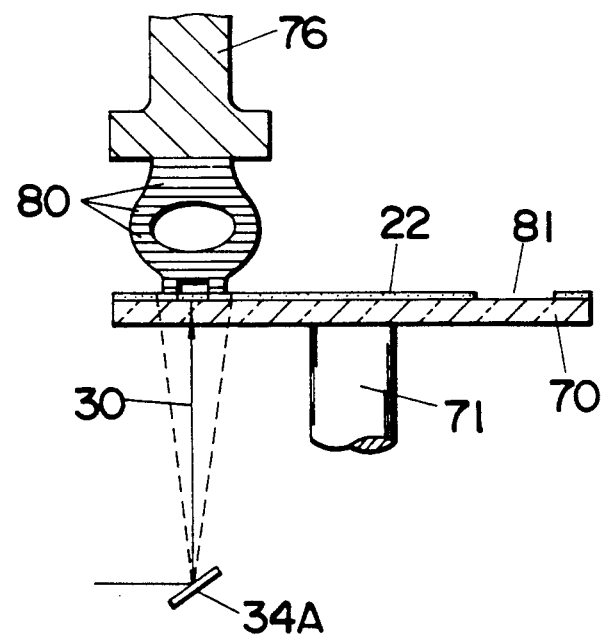

One typical process of fabricating a three-dimensional object by the use of the above device is illustrated in FIG. 9, composed of FIGS. 9A to 9D. As shown in FIG. 9A, drops of the liquid resin 20 is supplied to the center of the plate 70 and is forced to spread towards the periphery uniformly in radial directions as the plate 70 rotates, thereby forming the thin liquid resin film 22 having a uniform thickness. Excess amount of the liquid resin is flows off of the plate 70 by an centrifugal force. The thickness is determined by the properties of the liquid resin, such as specific gravity, viscosity, wettability of the plate 70, in combination with the rotational speed or angular velocity of the plate 70, and can be reduced to as little as the order of one micron by suitably controlling the above parameters. Then, the light beam 30 is directed through the transparent plate 70 from below, as shown in FIG. 9B, to the liquid resin film 22 with a pull-up lift 76 in contact with the film 22, for scanning a suitable two-dimensional pattern to provide a correspondingly thin cured layer 80 as being adhered to the bottom of the lift 76. As shown in FIG. 8, the working surface of the plate 70 is operationally divided into four quadrant sectors on each of which the layer so is formed by selectively directing the light beam to the confines of the sector. Thus, within one rotation of the plate 70, the cured layers 80A, 80B, 80C, . . . of the same or different two dimensional configurations are successively formed one by one on the adjacent sectors while rotating the plate 70 in a step-wise manner or in an index feed by an angle of 90°. These successively formed layers 80 are build up on each other as being formed and are pulled-up by the lift 76 away from the plate 70. That is, as shown in FIG. 9C, after the first layer 80A is formed and held supported on the lift 76, the plate 70 is rotated by an angle of 90° to place the fresh liquid resin film 22 into a position for exposure to the light beam 30. At this position, the light beam 30 is directed to the fresh film 22 with the first cured layer 80A kept in contact with the film 22, to thereby form the next layer 80B on the first layer 80A as being integrated therewith by inherent adhesion of the resin. In this manner, successive layers 80A, 80B, 80C, . . . are build up on the lower surface of the lift 76, while leaving corresponding voids 81 in the liquid resin film 22 on the plate 70. After one rotation cycle of building up the cured layers on the lift, a new liquid resin is supplied onto the plate to form a new film of the liquid resin to be ready for another step of forming the successive layers in a like manner. Such steps are repeated until the entire three-dimensional object as intended is fabricated, as shown in FIG. 9D. As described hereinbefore, each of the successive layers 80 is formed as the composite layer which comprises successive outer thin laminae at the portion defining the outer periphery of the object and inner thick lamina at the portion defining the core of the object, for the purpose of accurately representing the outer configuration of the object without lowering the overall fabrication efficiency. It is noted at this time that, with the use of the above device, it is readily possible to include within the object portion of different types of liquid resin or different colors by supplying the different types or colors of the liquid resin to the plate 70 from time to time.

Figure 10:
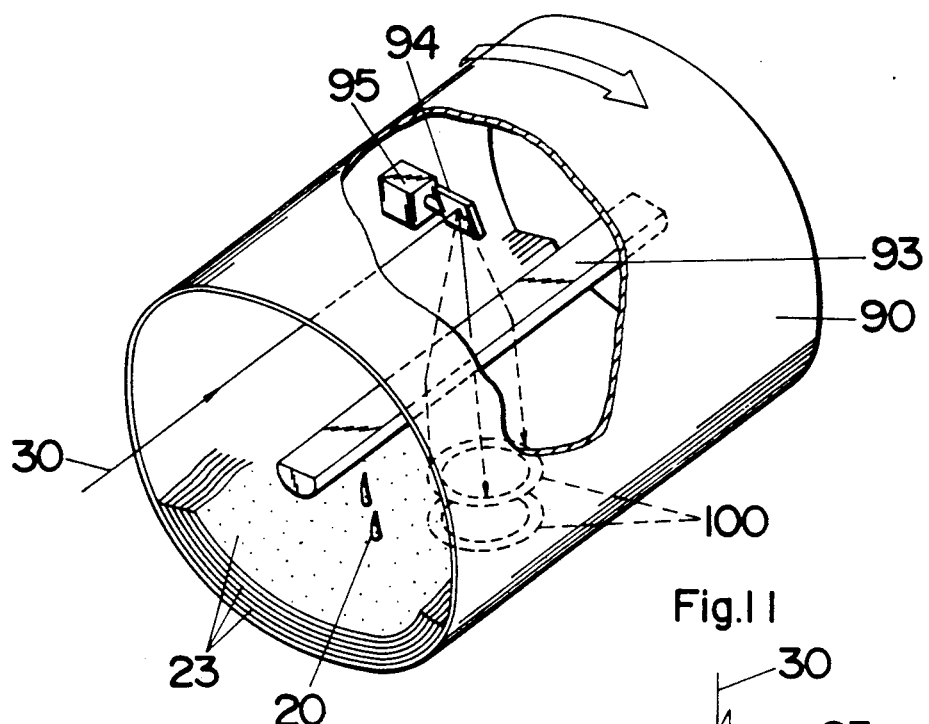
FIG. 10 is a schematic view illustrating a further device which may be utilized in the present invention to make successively thin layers of the cured resin into a three-dimensional object.
Figure 11:
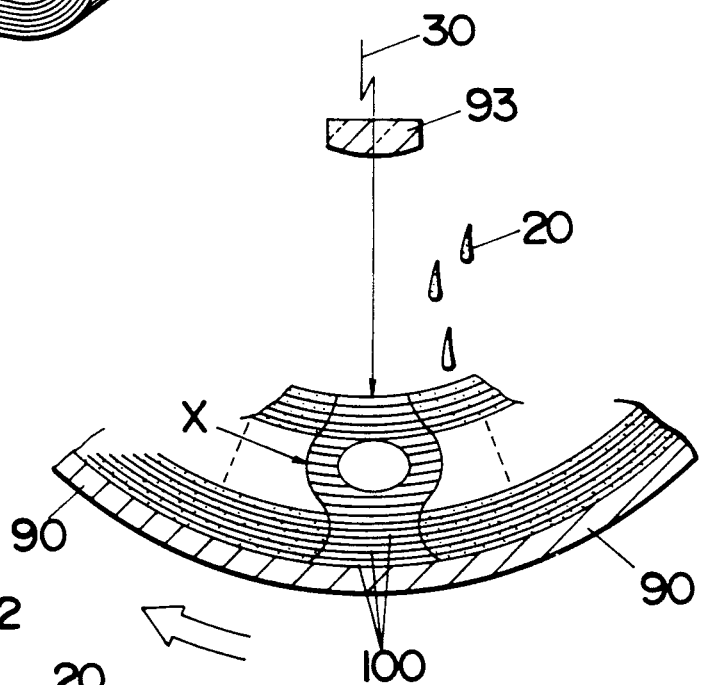
FIG. 11 is a schematic view illustrating a portion of a three-dimensional object with the device of FIG. 10.
Figure 12:
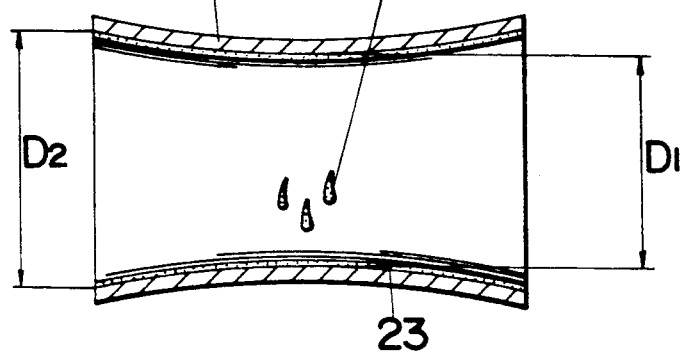
FIG. 12 is a schematic view illustrating a modification of the device of FIG. 10.

FIGS. 10 and 11 illustrate a further modification of the above embodiment which utilizes a generally cylindrical barrel 90 defining on its inside wall surface a supporting surface receiving the liquid resin 20. The like liquid resin is supplied into the barrel 90 as being dropped from the radial center of the barrel 90 towards the inner periphery or the supporting surface. For this purpose, a spout or set of spouts (not shown) is arranged along a horizontal center axis of the barrel 90 to feed the liquid evenly along the axis or at spaced intervals therealong. The barrel 90 is driven to rotate about the horizontal center axis in order to spread the liquid resin around the inner periphery to thereby provide thereon a very thin liquid resin film 23 of uniform thickness. A scanner 95 with a rotatable mirror 94 is disposed within the barrel 90 to redirect the light beam 30 parallel with the center axis coming from outside of the barrel 90 to the resin film 23 through a convergent half-cylindrical lens 93. The mirror 94 is arranged to rotate or change its angular orientation in order to move the redirected light beam in the direction parallel with the center axis. The light beam 30 may be introduced into the barrel 90 by way of optical fiber or the like transmission medium. Selected portions of the resin film 23 can be solidified into a correspondingly thin cured layer 100 by scanning or moving the light beam 30 in the axial direction while keep rotating the barrel 90. That is, light beam 30 is controlled to move in the axial direction while being also controlled to be turned on and off or suitably interrupted by means of a shutter to draw a suitable two-dimensional pattern on the film 23. After the first layer 100 is formed on the inner periphery of the barrel 90, the liquid resin is supplied to the interior of the barrel 90 to provide a fresh film 23 which is then exposed to the light beam 30 into a second cured layer 100 and is superimposed on the first layer 100 as being formed for integration therewith. These steps are repeated until the entire three-dimensional object X is formed on the inner periphery of the barrel 90. Finally, the object X is taken out of the barrel 90 and is washed by a suitable solvent &:o remove uncured liquid resin remaining adhered therearound to complete the fabrication of the object X. In the illustration, only one object X is fabricated on the interior of the barrel 90, however, it is equally possible to fabricate two or more objects within the single barrel 90 along the circumferential or axial direction by suitably controlling to scan the light beam as well as to rotate the barrel 90 in combination. The barrel 90 may have an uniform inside diameter or a varying inside diameter, as shown in FIG. 12, which is greater toward the axial ends [$D_2$] than at the axial center [$D_1$]. With the barrel 90A of the latter configuration, the liquid resin 20 fed to the axial center of the barrel 90A can be forced to spread towards to the axial ends while being spread around the inner periphery as the barrel 90A rotates about the center axis, thereby facilitating providing of a thin uniform film of the liquid resin over the entire inner surface of the barrel 90A with the use of a simplified liquid resin feed mechanism of dropping the liquid resin only from the axial center of the barrel 90A. It should be noted in this connection that by suitably selecting the rotational speed of the barrel 90A in association with the curvature of the interior surface thereof, in addition to the properties of the liquid resin, such as specific gravity and viscosity, and the feed rate thereof, it is possible to precisely control the forces to be applied to the liquid resin and therefore control the thickness of the resulting liquid resin film 23 over substantially the entire axial length of the barrel 90A to a very thin thickness. A sensor is preferably included in the above system to monitor the thickness of the film being provided for control of the rotation of the barrel in a feedback manner. Such feedback control may be also available in the aforementioned modifications. It is noted at this time that when the film of uniform thickness is made on the inner surface of the barrel 90A and becomes self-supported thereof after having been subjected to the centrifugal effect, the barrel may cease rotating or may slow down to a level appropriate for drawing the two-dimensional pattern on the thus formed film by the light beam. The above modifications are described for the purpose of providing the composite layer having thick inner lamina and thin outer successive laminae which are responsible for the accurate outer configuration of the object, it is of course advantageous for providing the very thin cured layer.

Second Embodiment

Figure 13A:
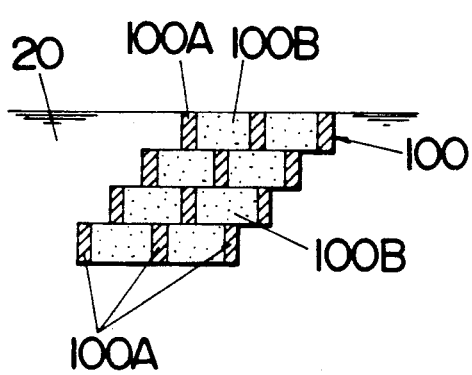
FIGS. 13A and 13B are schematic views illustrating different patterns of forming composite layers each including half-cured and substantially fully-cured resin in accordance with a second embodiment of the present invention.
Figure 13B:
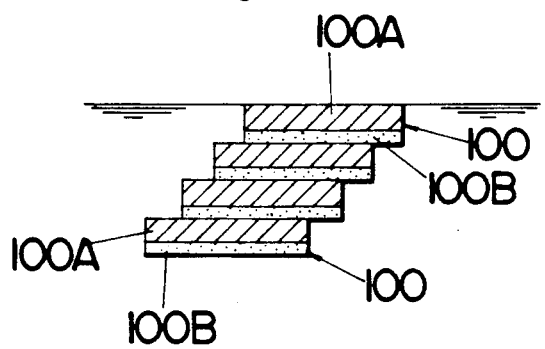
Figure 14A:
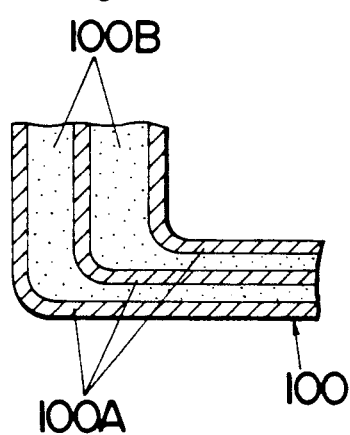
FIGS. 14A and 14C are partial cross-sectional views illustrating different patterns of forming one composite layer each including half-cured and substantially fully-cured reigns in accordance with the second embodiment of the present invention.
Figure 14B:
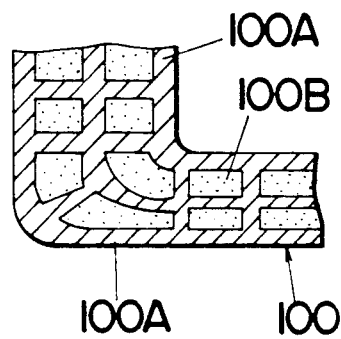
Figure 14C:
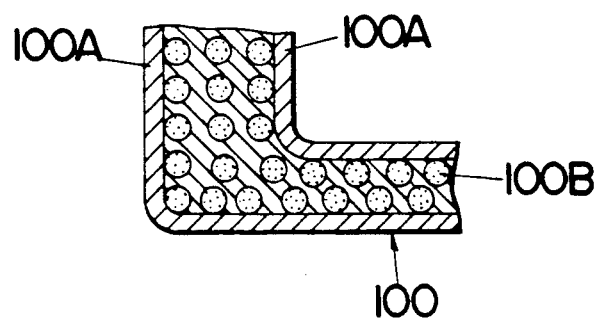

A second embodiment of the present invention is contemplated to present a laminate of the cured layers comprising composite layers each including a substantially fully-cured region and a half-cured or uncured region, which laminate is thereafter subjected to a reactive environment to complete the curing and the fabrication of a three-dimensional object. As shown in FIGS. 13A and 13B, the composite layer 100 may be formed to have a fully-cured region 100A horizontally or vertically separated from the half-cured region 100B. Such a half-cured region 100B can retain limited deformability and is therefore capable of absorbing the curing shrinkage developed in the adjacent fully-cured region, thereby relieving any shrinkage stress thereof and therefore minimizing the residual stress in the finished object, which contributes to accurate fabrication of the three-dimensional object. Preferably, the fully-cured regions 100B of the successive layers 100 are formed to construct a framework or outer shell of an intended three-dimensional object, as typically shown in FIG. 13A, for the purpose of accurately determining the outline of the object and at the same time for confining the half-cured resin therein to prevent undesired outflow of the resin. In FIGS. 14A to 14C, there are shown typical patterns of the fully-cured regions 100A and the half-cured regions 100B in cross-sections of the composite layers 100 when the framework of the object is constructed by the fully-cured regions 100A. In FIG. 14A, the fully-cured regions 100A extend along the outer periphery to form an outer shell and also in the inner portion substantially in parallel with the outer shell to form a center band. In FIG. 14B, fully-cured regions 100A are added to the pattern of FIG. 14A to form a lattice pattern in which the center band and the outer shell are bridged by transversing ribs of the fully cured resin. In FIG. 14C, the fully-cured regions 100A extend along the outer periphery to form an outer shell and also in the inner portion to leave a number of dotted the half-cured region 100B.

Figure 15:
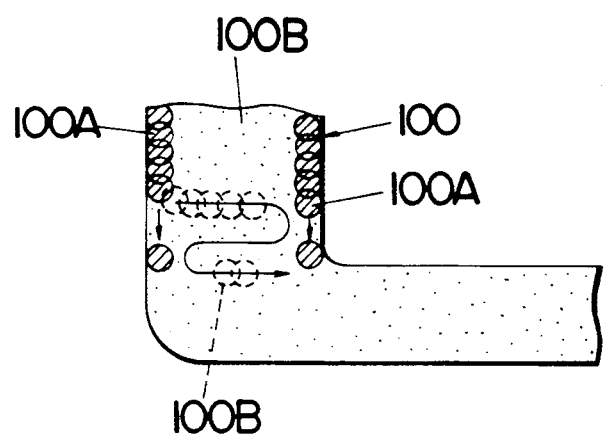
FIG. 15 is a partial cross-sectional view illustrating a particular pattern in which a composite layer is made by the use of first and second light beams to have half-cured and substantially fully-cured regions in accordance with a first modification of the second embodiment.

These composite layers 100 of the second embodiment can be formed by directing the light beam 30 to the surface of the liquid resin 20 stored in the container, or with the like system as utilized in the first embodiment. The fully-cured region 100A and the half-cured region 100B can be selectively formed by varying the light energy given to the liquid resin, for example, by varying the intensity, focusing spot size, wavelength of the light beam singly or in combination. In a simplest way, the light beam may be controlled to move at different scanning speed to differentiate the light energy given to the fully-cured and half-cured regions intended. Alternatively, two or more separate light beams of differing curing capabilities may be utilized to form the fully-cured region 100A and the half-cured region 100B, respectively. For example, to obtain the composite layer 100 of FIG. 13B the half-cured region 100B is firstly formed by the use of the light beam of less curing capability followed by forming the fully-cured region 100A on the half-cured region 100B by the use of the light beam of greater curing capability. Also, by the use of such separate light beams of different curing capability, the horizontally spaced fully-cured region 100A and half-cured regions 100B can be formed, as exemplarily shown in FIG. 15, by moving the beam spot of relatively small diameter along the outer periphery to form thereat the fully-cured regions 100A in precise conformity with the intended outer configuration while moving the beam spot of relatively large diameter in a zigzag fashion, as indicated by an arrow in the figure, over the inner portion at a relatively high scan rate to form thereat the half-cured region 100B for increased efficiency. Further, to obtain the dotted half-regions 100B of FIG. 14C, a specially configured light beam is utilized to give a ring-shaped energy distribution pattern having greater intensity at its peripheral portion than at the inner center portion. Such light beam is controlled to move across the surface of the liquid resin while being continuously turned on and off, thereby forming the dotted half-cured regions 100B surrounded by the fully-cured region 100A. The stack or laminate of thus formed composite layers is removed from the container, and is finally exposed to an ultraviolet floodlight of a xenon lamp such that the half-cured regions are cured to the same condition as the fully-cured region to complete the fabrication of the three-dimensional object.

The above composite layer may include, in addition to the substantially fully-cured region, an uncured resin region in place of the half-cured region, such that the uncured region can show more flexibility to absorb the shrinkage stress or deformation developed at the solidification of the liquid resin into the adjacent fully-cured region, thereby greatly minimizing the residual stress in the object and therefore assuring more accurate configuration thereof. When fabricating the three-dimensional object with such composite layers, it is mostly preferred to use the top and bottom layers having its entire portion substantially fully-cured in order to prevent the outflow of the uncured resin prior to completing the solidification of the entire object. The above scheme may be of course be applicable to the fabrication with the use of the composite layer having the half-cured regions rather than the uncured regions.

Figure 18:
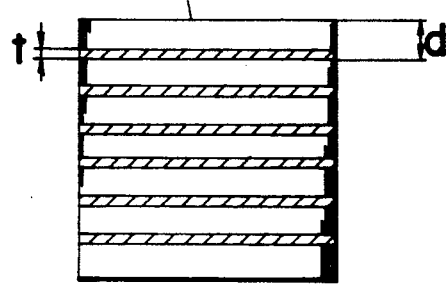
FIG. 18 is a schematic plan view illustrating a manner in which a top layer forming the object of FIG. 17 is cured.
Figure 19:
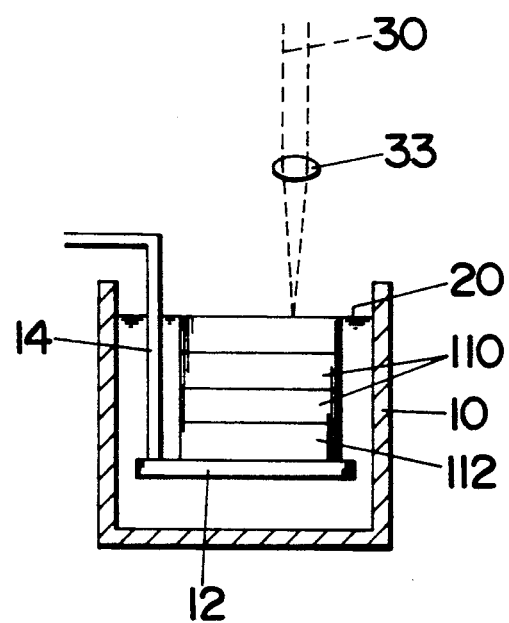
FIG. 19 is a schematic view illustrating a system utilized for fabrication of the object of FIG. 17.
Figure 20A:
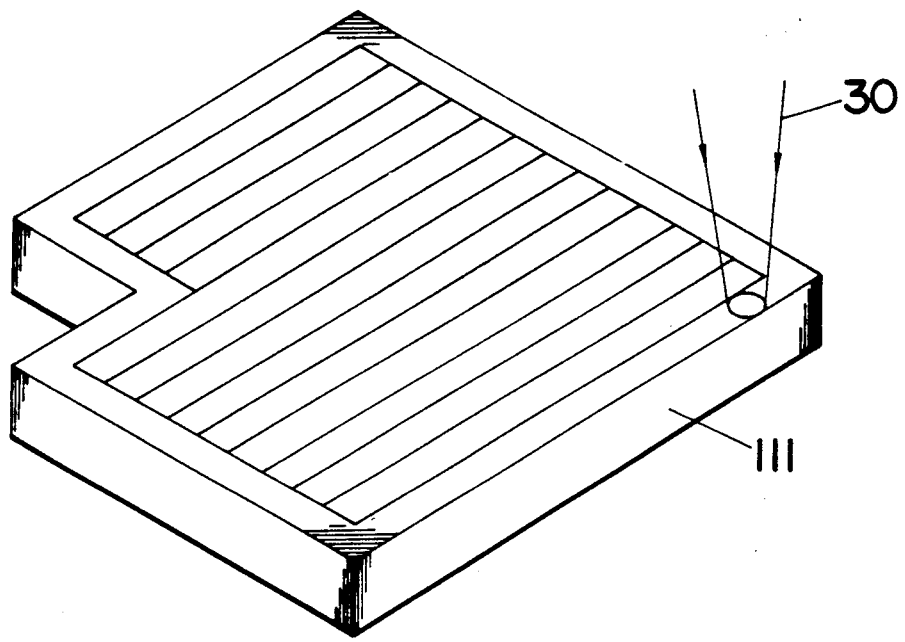
FIGS. 20A and 20B are schematic views respectively illustrating the pattern of the light beam for generating the top layers and the composite layers of FIG. 17.
Figure 20B:
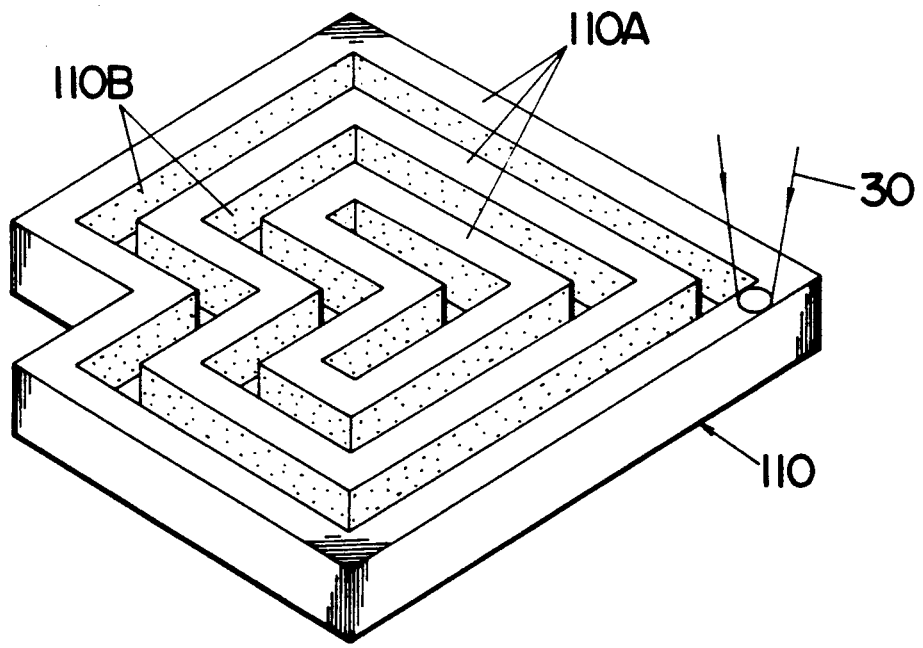
Figure 21:
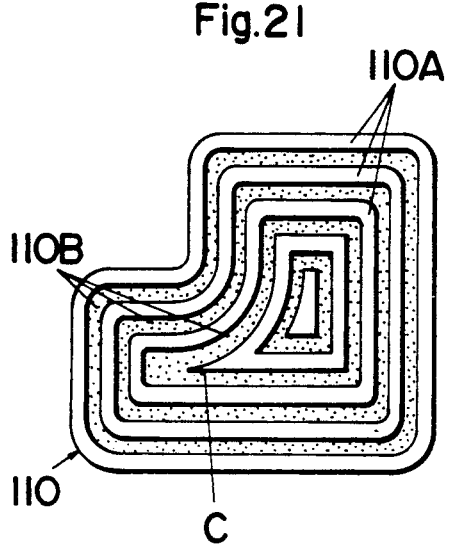
FIGS. 21 to 22 are plan views illustrating different patterns of the composite layers which may be utilized for fabrication of the object in accordance with the second embodiment of the present invention.

As exemplarily shown in FIGS. 17 to 20, the above fabrication process utilizes a system of FIG. 19, which is identical to that of FIG. 3 utilized in the first embodiment, to successively form the layers 110, 111, and 112 from the surface of the liquid resin 20 in the container 10 by directing the laser beam 30 through the lens 33 to the surface of the liquid resin 20. The bottom layer 112 is firstly formed as supported on the carrier plate 50 to have its entire portion solidified into substantially fully-cured condition. Such solidification of the bottom layer 112 is made by firstly scanning the light beam 30, as shown in FIG. 20A, along the outer periphery of the intended outer configuration and by subsequently scanning the light beam 30 having a spot diameter of d line by line or in a raster pattern over the portion except for the already cured outer periphery, in such a manner as to leave the overlapped band t between the adjacent lines, as shown in FIG. 18. The intermediate or composite layers 110 are then successively formed by scanning the light beam 30, as shown in FIG. 20B, along the outer periphery of the intended outer configuration and also over the inner portion thereof in such a manner as to present a set of nested analogous walls of the fully-cured region 100A, while leaving uncured regions 100C between the adjacent nested walls. These intermediate layers 110 are superimposed on each other as integrated with the bottom layer 112. The top layer 111 is formed in the like manner as the bottom layer 112 and is integrated on the last intermediate layer 110. The stack of thus formed layers are removed from the container 10 and is exposed to an ultraviolet floodlight to effect the solidification of the uncured portion, in the like manner as described hereinbefore, to complete the process. It is noted at this time that one or more of the intermediate layers may be formed to have its entire portion solidified into a fully-cured condition in a like manner as the top and bottom layers depending upon the intended configuration of the object.

Figure 22:
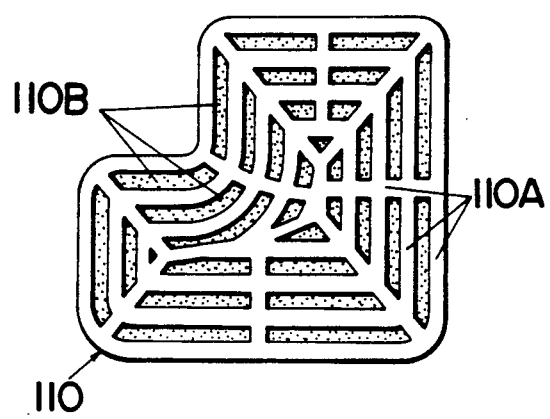
Figure 23A:
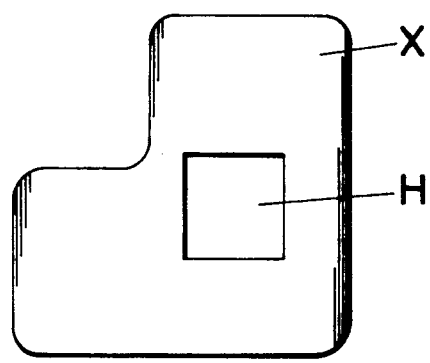
FIG. 23A is a cross-section of an intended three-dimensional object with a bore which can be fabricated in accordance with the second embodiment.
Figure 23B:
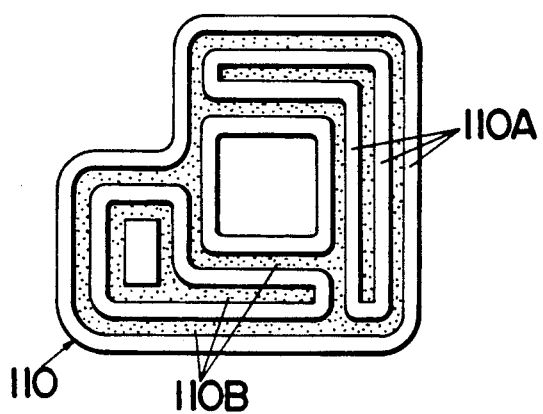
FIG. 23B is a plan view illustrating a particular pattern of a composite layer composing the object of FIG. 23A.
Figure 24:
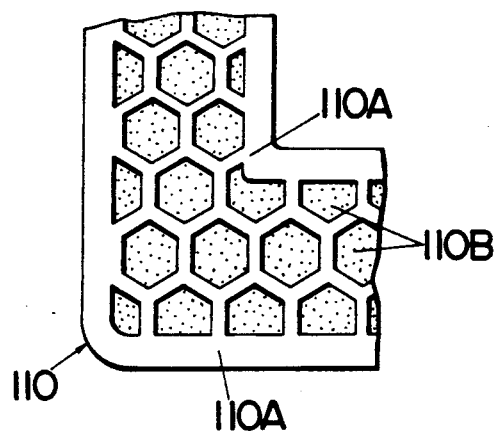
FIG. 24 is a partial plan view illustrating another pattern of the composite layer.
Figure 25:
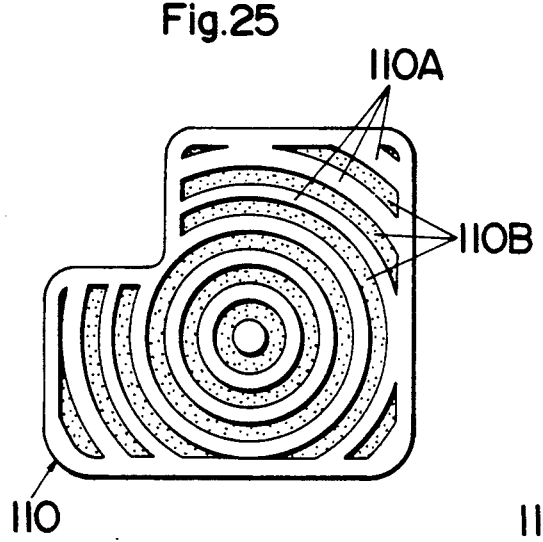
FIGS. 25 to 28 are plan views illustrating still further different patterns for the composite layers composing the object.
Figure 26:
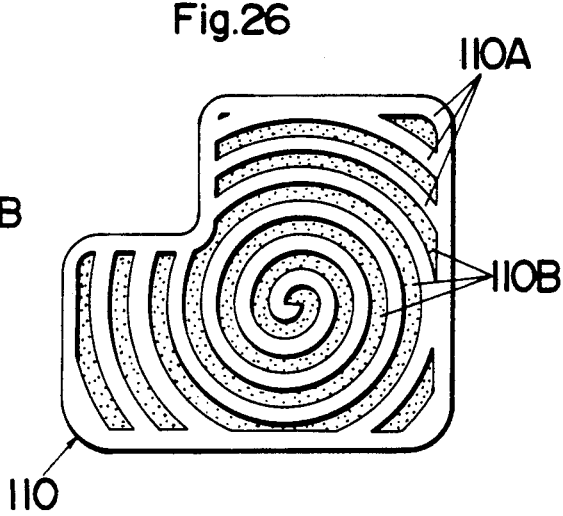
Figure 27:
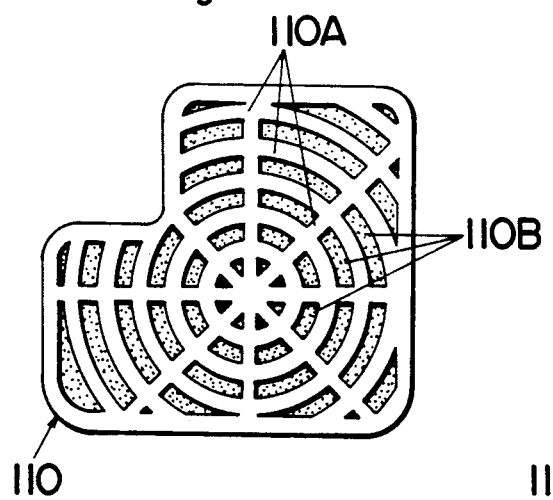
Figure 28:
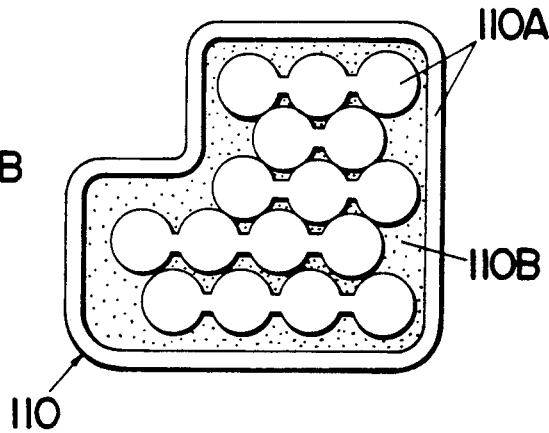

The pattern of the fully-cured region in the intermediate layer 110 is not limited to the above particular pattern, and many other different patterns can be selected depending upon the configuration of the intended object. For example, the intermediate layer 100 may have a somewhat different pattern from that of FIG. 20B, in which a sharp corner C appears in the inner nested wall or center core block where it is difficult to be shaped into configuration analogous to the outer walls, such as corner C being formed by narrowing the light beam spot. FIG. 22 shows a further modified pattern in which the nested walls of the fully-cured region 110A are bridged by a number of transverse ribs. When fabricating a three-dimensional object X with a through-hole H, as shown in FIG. 23A, the intermediate layer 110 is formed to include an inner wall of the fully-cured region 110A which is in the form of a closed loop defining the border of the through hole H, in addition to an outer wall of the fully-cured region 110A defining the outer periphery of the cross-section of the object and other closed loop walls or a block of the fully-cured regions disposed between the inner and outer walls. Further, as shown in FIG. 24, the composite layer may be partially solidified to form a honeycomb pattern in the inner portion thereof. FIGS. 25 to 28 show other available patterns of the fully-cured regions 110A in the cross-section of the composite layers 110.

Third embodiment

Figure 16:
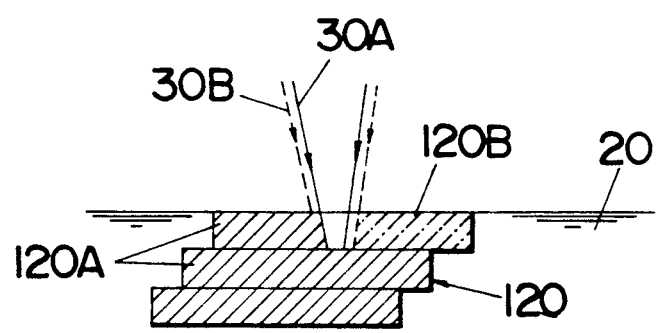
FIG. 16 is a schematic view illustrating a manner in which the layer of the cured resin is formed by the use of first and second light beams having different curing capacities in accordance with a third embodiment of the present invention.
Figure 17:
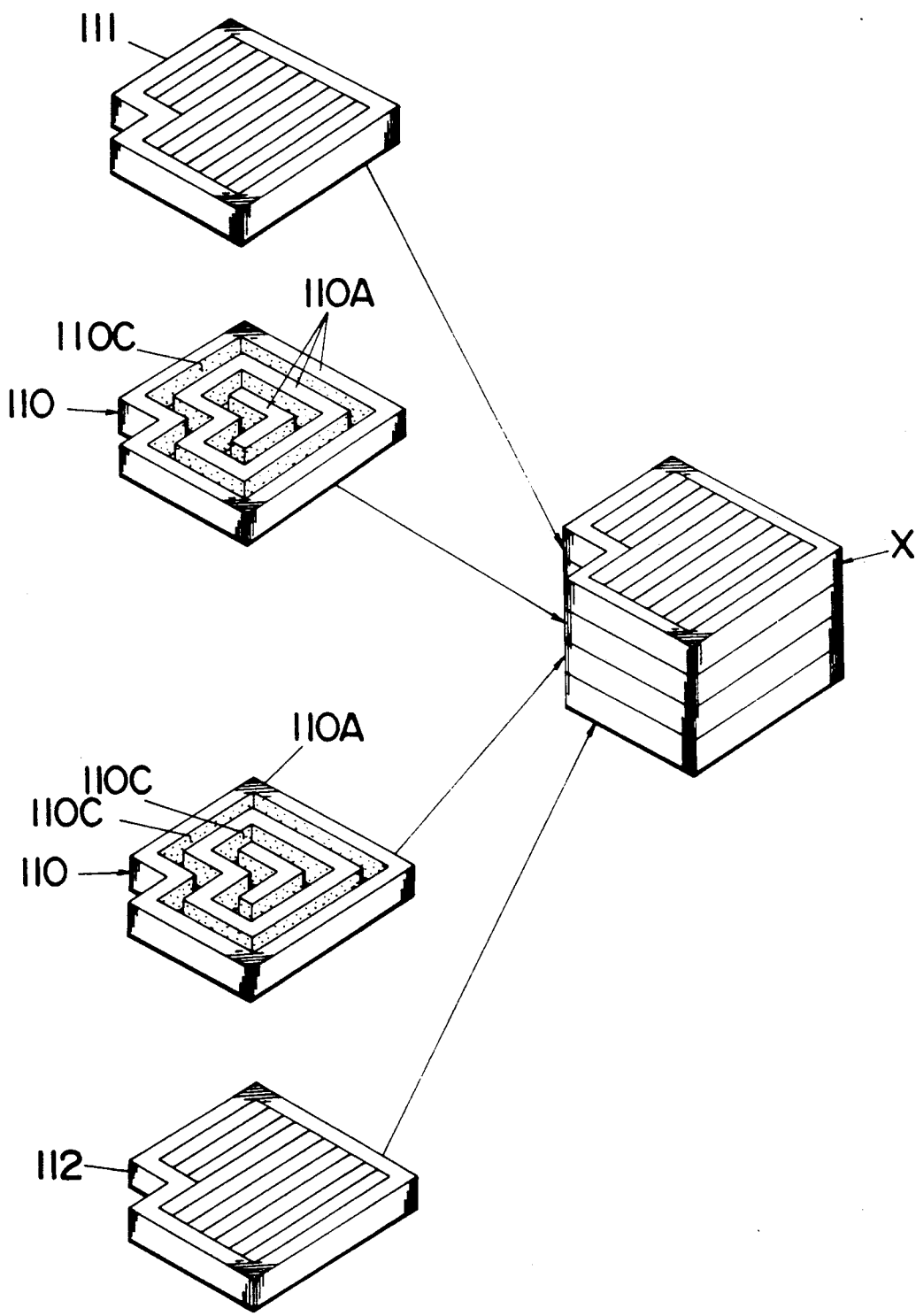
FIG. 17 is a schematic view illustrating one typical three-dimensional object and its particular layers fabricated in accordance with a second embodiment of the present invention.

As shown in FIG. 16, a third embodiment of the present invention provides a process of fabricating a three-dimensional object by superimposing successive cured layers 120 each of which is formed by the use of first and second light beams of different curing capabilities. The process utilizes a system like that of FIG. 3 except that it requires the first light beam 30A and second light beams 30B of less curing capability than the fist light beam 30A. For example, the first light beam 30A is generated as an ordinal He-Cd laser, while the second beam 30B is generated as YAG laser or $CO_2$ laser exhibiting heat-curing effect on the light curable resin 20. In accordance with this embodiment, each layer 120 is formed from the liquid resin 20 in the container 10 through the steps of firstly solidifying the liquid resin 20 into a half-cured region 120B by exposure 10 into the second light beam 30B and subsequently converting thus half-cured region 120B into a substantially fully-cured region 120A by exposure to the first light beam 30A, as shown in FIG. 16. To focus the first light beam 30A exactly on the half-cured region 120B and therefore to form the fully-cured region in a precise conformity to the intended outer configuration of the object, it is preferred to give a smaller beam spot to the first light beam 30A than to the second light beam 30B. In the illustrated embodiment where the first and second light beam 30A and 30B are arranged to be concentric with one another to be capable of scanning over the surface of the liquid resin 20 by the use of a common scanning mechanism, the first and second light beams 30A and 30B are controlled to be energized in a delayed fashion in order to firstly form the half-cured region 120B and then covert it into the fully-cured region 120A. Alternatively, by providing the first and second light beams 30A and 30B in an offset relation along the scanning direction, it is possible to make the half-cured region and the fully-cured region sequentially as the scanning proceeds. In either case, the half-cured region remaining outwardly of the fully-cured region can be easily removed off by the use of a suitable solvent. In accordance with the process of this embodiment, the fully-cured region is prepared not directly from the liquid condition but from the half-cured condition in which the resin flow is more or less restricted, therefore not further critical deformation or curing shrinkage is expected at the final solidification into the fully-cured condition. Whereby the residual stress in the resulting three-dimensional object can be minimized enough to assure accurate configuration which is stable over an extended period of time. Further, since the fully-cured region free from substantial residual stress will expand as the first laser beam moves in this process, no substantial difference is seen with respect to the curing shrinkage or shrinking stress between the initially and finally fully-cured portion, which eliminates uneven distribution of the curing shrinkage or shrinking stress over the entire portion of the layer 120, which in turn contributes to accurate fabrication of the three-dimensional object.

It should be noted that the features of the above embodiments and modification can be suitably combined in any manner so as to further improve the fabrication process.

What is claimed is:

1. In a process of forming a three-dimensional object from a light curable liquid resin by radiating a light to a surface of said light curable liquid resin to form successive cross-sectional layers of the cured resin and superimposing said layers on each other, an improvement comprising:

forming a plurality of said layers to include successive thin outer laminae of the cured resin at a peripheral portion defining an outer perimeter of said three-dimensional object and a relatively thick inner lamina at an other portion defining a core of said three-dimensional object, said successive thin laminae cooperating with said center lamina to compose one of said layers.

2. In a process of forming a three-dimensional object from a light curable liquid resin by radiating a light to a surface of said light curable liquid resin to form successive cross-sectional layers of the cured resin and superimposing said layers on each other, an improvement comprising:

forming a plurality of said layers to have substantially fully-cured and half-cured regions, superimposing said successive cross-sectional layers, and subsequently completing the curing of said half-cured regions into fully-cured regions so as to constitute a portion of said three dimensional object by subjecting said layers to a reactive environment for integration of said layers into said three-dimensional object, the substantially fully-cured and formerly half-cured regions constituting an outer perimeter and a core respectively of the three-dimensional object.

3. A process of forming a three-dimensional object as set forth in claim 2, wherein said light comprises a first light beam and a second light beam for solidification of said curable liquid resin, respectively into said substantially half-cured and said substantially fully-cured regions, and said substantially fully-cured and half-cured regions defining an outer perimeter and a core of said three-dimensional object, respectively.

4. In a process of forming a three-dimensional object from a light curable liquid resin by radiating a light to a surface of said light curable liquid resin to form successive cross-sectional layers of the cured resin and superimposing said layers on each other, an improvement comprising:

forming a bottom layer having its entire portion solidified into a substantially fully-cured condition;

forming successively intermediate layers which include portions respectively solidified into substantially full-cured condition and half-cured or uncured condition, a first one of said successive intermediate layers being superimposed on said bottom layer and the remaining intermediate layers being superimposed on each other as they are formed;

forming a top layer having its entire portion solidified into a substantially fully-cured condition and superimposing said top layer on the preceding intermediate layer; and subsequently completing the curing of said portions which are half-cured or uncured into fully-cured portions so as to constitute a part of said three dimensional object by subjecting said superimposed layers to a reactive environment, the substantially fully-cured region constituting an outer perimeter and the region which was formerly half-cured or uncured constituting a core of the three-dimensional object.

5. A process of fabricating a three-dimensional object as set forth in claim 4, wherein an additional intermediate layer is included in said intermediate layers said additional intermediate layer being of substantially fully-cured resin.

6. A process of forming a three-dimensional object from a light curable liquid resin by radiating a light to a surface of said light curable liquid resin to form successive cross-sectional layers of the cured resin and superimposing said layers on each other, said process utilizing a planar support which is transparent to said light and a lift movable toward and away from one side of said support, said process comprising the steps of:

a) supplying said light curable liquid resin on said support;

b) moving said support in order to spread said liquid resin thereover to form a thin film of said light curable liquid resin;

c) irradiating said light through said support to cure said thin film of said liquid resin into a corresponding cross-sectional layer;

d) operating said lift to remove said cross-sectional layer from said support and accumulate said layer on said lift; and repeating the steps a) to d) to obtain on said lift successive cross-sectional layers of cured resin forming said three-dimensional object of a desired outer configuration.

7. A process of forming a three-dimensional object as set forth in claim 6, wherein the moving of said support is a rotation substantially in a horizontal plane which includes the surface of said support.

8. A process of forming a three-dimensional object as set forth in claim 6, wherein the moving of said support is an oscillation substantially in a horizontal plane which includes the surface of said support.

9. A process of forming a three-dimensional object from a light curable liquid resin by radiating a light to a surface of said light curable liquid resin to form successive cross-sectional layers of the cured resin and superimposing said layers on each other, said process utilizing a planar support which is transparent to said light and a lift movable toward said away from one side of said support;

said process comprising the steps of:

a) supplying said light curable liquid resin on said support;

b) moving said support in order to spread said liquid resin thereover to form a thin film of said light curable liquid resin;

c) irradiating said light through said support to cure a portion of said thin film of the liquid resin into a first corresponding cross-sectional layer;

d) operating said lift to remove said cross-sectional layer from said support and accumulate said layer on said lift;

e) displacing said support to locate in place on said support a remaining uncured further portion of said thin film of the liquid resin for subsequent irradiation of said light;

f) irradiating said light through said support to cure said further portion of said thin film of the liquid resin into a second corresponding cross-sectional layer;

g) operating said lift to remove said second cross-sectional layer from said support and accumulate said second layer on said first cross-sectional layer on said lift; and h) repeating the steps a) to g) to obtain on said lift successive cross-sectional layers of cured resin forming said three-dimensional object of a desired outer configuration.

10. A process of forming a three-dimensional object as set forth in claim 9, wherein
step e) includes rotating said support about an axis perpendicular to a plane of the support for displacing said support.

11. A process of forming a three-dimensional object from a light curable liquid resin by radiating a light to a surface of said light curable liquid resin to form successive cross-sectional layers of the cured resin and superimposing said layers on each other, said process utilizing a generally cylindrical barrel having a generally horizontal center axis, said process comprising the steps of:

a) supplying said light curable liquid resin on an inner surface of said cylindrical barrel;

b) rotating said barrel about said generally horizontal center axis for spreading said light curable liquid resin over the inner surface of said barrel to form thereon a thin film of said light curable liquid resin;

c) irradiating said light to cure said thin film of said liquid resin into a corresponding cross-sectional layer while rotating said barrel about said axis; and d) repeating steps a) to c) to obtain on said inner surface of said cylindrical barrel successive cross-sectional layer of cured resin to form said three-dimensional object.

12. A process of forming a three-dimensional object as set forth in claim 11, wherein
said barrel accommodates therein a light directing means for directing said light from an external source to said light curable liquid resin.

13. A process of forming a three-dimensional object as set forth in claim 12, wherein
said light directing means comprises:
a rotatable mirror reflecting said light from said light source toward the inner surface of said barrel;
a scanner rotating said mirror about an axis to scan said light in the direction of said horizontal center axis; and
a cylindrical lens extending along said horizontal center axis to diverge said light onto said thin film of liquid resin.

* * * * *